3,565,578
METHOD OF TREATING SODIUM
TETRABORATE SOLUTIONS
Kendrick R. Eilar, Whittier, Calif., and Alan D. Randolph, Gainesville, Fla., assignors to American Potash & Chemical Corporation, Los Angeles, Calif., a corporation of Delaware
No Drawing. Filed Mar. 27, 1968, Ser. No. 716,310
Int. Cl. B01d 9/02; C01b 35/00
U.S. Cl. 23—59                                                          10 Claims

ABSTRACT OF THE DISCLOSURE

A method of treating an aqueous brine solution containing sodium tetraborate and fatty acids to remove the fatty acids from the brine. The brine solution is contacted with a quaternary ammonium compound to form an immiscible complex of the fatty acid and the quaternary ammonium compound. The immiscible complex is separated from the brine solution to thereby remove the fatty acids from the brine. Sodium tetraborate crystals subsequently crystallized out of the brine solution have a desirable crystal habit.

BACKGROUND OF THE INVENTION

(1) Field of the invention

This invention relates to a method of treating an aqueous brine solution containing sodium tetraborate and fatty acids. More particularly, the invention relates to a method of removing fatty acid crystal habit modifiers from an aqueous brine solution which contains sodium tetraborate so that the sodium tetraborate crystallized out of the solution has a desirable chunky crystal habit.

(2) Description of the prior art

In recovering sodium tetraborate from aqueous brine solutions in a commercial operation, one or more surface active agents in the form of fatty acids are usually added to the brine solution as antifoamants, flotation agents and the like. However, the presence of such fatty acids in the brine solution creates a number of problems which adversely affect sodium tetraborate production. Thus, sodium tetraborate crystallized out of an aqueous brine solution to which such fatty acids have been added contains a relatively large amount of organic impurities which must subsequently be removed. In addition, it has been found that fatty acids act as crystal habit modifiers whereby the presence of such fatty acids in the brine solution modifies the crystal habit and form of sodium tetraborate crystallized from the brine. Thus, the presence of fatty acids in the brine causes the sodium tetraborate to crystallize as undesirable, elongated, needle-shaped or rice-like crystals rather than as desirable chunky crystals. The fatty acid crystal habit modifier is carried along with the sodium tetraborate crystals in a form that cannot be removed by repulping and recrystallization. In other words, even if crude sodium tetraborate crystals, obtained from solutions of borate ores, natural brines, and the like to which one or more fatty acids have been added, are dissolved in a suitable aqueous solvent, and sodium tetraborate is subsequently recrystallized from the solution, the sodium tetraborate thus recovered will have an undesirable, elongated, needle-shaped or rice-like crystal form.

The formation of elongated needle-shaped or rice-like crystals generally is undesirable for the elongated crystals are difficult to screen so that processing efficiencies are reduced. In addition, the elongated crystals may pass through the screens lengthwise thereby producing an undesirable coarse product. Furthermore, the elongated crystals tend to interlock so that product flow characteristics are poor. In contrast, when chunky crystals are formed, improved screening efficiencies and improved product characteristics are obtained. While a number of techniques have been suggested heretofore for removing such fatty acid crystal habit modifiers from the aqueous brine solution, such prior techniques suffer from a number of disadvantages which make their use less than completely satisfactory in a commercial operation.

SUMMARY OF THE INVENTION

The present invention provides a method of treating an aqueous brine solution to remove fatty acids from the brine. According to this invention, an aqueous brine solution containing sodium tetraborate and one or more fatty acids is contacted with a quaternary ammonium compound to form an immiscible complex of the fatty acids and the quaternary ammonium compound. The immiscible complex thus formed is separated from the brine solution to thereby remove the fatty acids from the brine. Sodium tetraborate may subsequently be crystallized out of the brine solution. The sodium tetraborate crystals recovered in this manner have a desirable hexagonal or chunky crystal habit.

DESCRIPTION OF THE PREFERRED EMBODIMENTS

According to the present invention, sodium tetraborate crystals having a chunky crystal habit can be crystallized from an aqueous sodium tetraborate-containing brine solution to which one or more fatty acids have been added, by contacting the solution with a quaternary ammonium compound prior to crystallizing sodium tetraborate from the aqueous solution. It has been discovered that certain quaternary ammonium compounds can be advantageously employed to form an aqueous-immiscible complex with fatty acids present in an aqueous brine solution to thereby remove such fatty acids from the solution. The immiscible complex thus formed may be separated from the brine solution by any suitable means such as, for example, filtration, skimming, agglomeration and the like. thereby removing the fatty acids from the brine solution. Sodium tetraborate decahydrate or pentahydrate may subsequently be crystallized from the treated brine solution by conventional procedures. Since the fatty acid crystal habit modifiers are removed from the aqueous solution prior to crystallization of sodium tetraborate therefrom, the sodium tetraborate crystals thus recovered have a desirable chunky crystal habit.

The aqueous brine solution treated according to the method of this invention may be obtained from a number of sources. For example, such a solution may be obtained by the concentration and manipulation of natural brines such as Searles Lakes and Owens Lake brine, by the decomposition and dissolution of borate ores or the like. One or more fatty acids such as, for example, lauric acid, myristic acid, myristoleic acid, palmitic acid, palmitoleic acid, stearic acid, oleic acid, linoleic acid and the like, are usually added to the aqueous solution as antifoamants, flotation agents, and the like during the processing of the brine. Crude sodium tetraborate, that is sodium tetraborate containing an appreciable amount of other salts, may be recovered from such brines by procedures well known in the industry. However, as discussed hereinabove, the presence of fatty acids in the brine solution adversely affects the crystal habit of the sodium tetraborate. Treating such an aqueous solution according to the method of this invention enables the crude sodium tetraborate crystallized from the solution to have a desirable chunky crystal habit.

Generally, it is preferred to treat, in the method of this invention, an aqueous brine solution prepared from crude sodium tetraborate which has been crystallized from a solution which contains one or more fatty acids. Thus, crude sodium tetraborate is dissolved in water or any suitable aqueous solvent, such as end liquor from previous crystallization of sodium tetraborate, to provide an aqueous brine solution. Since the fatty acids contained in the original solution are carried along with the crude sodium tetraborate crystals, such fatty acid values are present in the aqueous brine solution to be treated.

The concentration of fatty acids present in the aqueous brine solution may vary considerably. Generally the aqueous solution contains between about 5 and 200 p.p.m., and usually between about 10 and 100 p.p.m. of fatty acids. The method of the present invention, however, is effective in treating brines containing greater or lesser amounts of fatty acids.

The quaternary ammonium compounds which are employed in this invention have the formula:

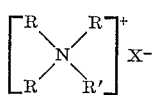

wherein R is selected from the group consisting of alkyl, alkene, alkyne radicals and long chain aliphatic hydrocarbon radicals having from 6 to 22 carbon atoms, R' is a long chain aliphatic hydrocarbon radical having from 6 to 22 carbon atoms, with all of the R and R' substituents together having at least about 20 and no more than about 65 carbon atoms, and X is an anion. The quaternary ammonium compounds used in this invention are slightly soluble in the aqueous brine solution to be treated.

Although all of the quaternary ammonium compounds defined by the above formula can be used in the process of this invention, it is generally preferred to use those which contain at least two of said long chain aliphatic hydrocarbon radicals having from 6 to 22 carbon atoms. Thus, preferably at least one of the R substituents is a long chain aliphatic hydrocarbon radical having from 6 to 22 carbon atoms. When the compound contains more than one of said long chain aliphatic hydrocarbon radicals, they may be alike or different, straight or branched chain. As a general matter, these fatty groups are derived by well known procedures from fatty acids obtained from various fats and oils. Preferably, the said long chain aliphatic hydrocarbon radical should contain no more than two double bonds, for the effectiveness of the quaternary ammonium compound in removing fatty acids from the aqueous solution is reduced when the long chain aliphatic hydrocarbon radical contains more than two double bonds. Particularly good results are obtained when the long chain aliphatic hydrocarbon radical is saturated or singly unsaturated.

The R substituents of the quaternary ammonium compound may be the same or different. As discussed hereinabove, preferably at least one of the R substituents is a long chain aliphatic hydrocarbon radical, as defined.

In general, any anion may be used for the quaternary ammonium compound. Chloride is the anion most commonly present in commercially available quaternary ammonium compounds and is the preferred anion. Other anions, such as bromide, iodide, sulfate, bisulfate, nitrate, phosphate and the like may, of course, also be used. However, there is no particular advantage in the use of salts other than the readily available quaternary ammonium chlorides.

The quaternary ammonium compounds may be prepared in any of the well known and conventional manners of forming quaternary ammonium compounds.

Specific examples of quaternary ammonium compounds which may be used in this invention include:

dilauryldimethylammonium chloride
dimyristyldimethylammonium chloride
dipalmityldimethylammonium chloride
distearyldimethylammonium chloride
di(oleyl-linoleyl)dimethylammonium chloride
dicocodimethylammonium chloride
di(hydogenated tallow)dimethylammonium chloride
tricaprylylmethylammonium chloride
dilaurylmethylethylammonium chloride
stearyltrimethylammonium chloride
oleyltrimethylammonium chloride The quaternary ammonium compound is usually provided in a non-aqueous solvent such as for example, methyl alcohol, ethyl alcohol, isopropyl alcohol, n-propyl alcohol, isobutyl alcohol and n-butyl alcohol. The concentration of quaternary ammonium compound in the solvent may vary considerably, from about 25% or less to about 80% or more.

Preferably the aqueous brine solution is contacted with an amount of quaternary ammonium compound which is substantially stoichiometrically equivalent to the concentration of fatty acids contained in the brine. Thus, when the amount of the quaternary ammonium compound contacted with the brine solution is substantially the same as the concentration of fatty acids in the brine, substantially complete removal of the fatty acids from the brine solution is effected. Lesser concentrations of the quaternary ammonium compound in the brine solution may, of course, be used if desired. However, when the amount of quaternary ammonium compound contacted with the brine solution is substantially less than the amount of fatty acids contained therein, not all of the fatty acids will be removed from the brine. As a result, a portion of the sodium tetraborate crystals subsequently crystallized from the brine solution have the undesirable elongated crystal habit. While amounts of the quaternary ammonium compound in excess of the stoichiometric amount may be used, if desired, generally such higher concentrations are economically undesirable.

The quaternary ammonium compound may be contacted with the aqueous brine solution in any suitable manner. Generally, the quaternary ammonium compound is added to the aqueous brine solution and the mixture agitated until the immiscible fatty acid-quaternary ammonium complex forms.

The aqueous brine solution preferably is at an elevated temperature that is, above about 100° F., when it is contacted with the quaternary ammonium compound. The use of such elevated temperatures not only facilitates recovery of sodium tetraborate from the brine solution but also promotes formation of the immiscible fatty acid complex. Thus, when the temperature of the aqueous brine solution is between about 150° and 220° F., the fatty acid-quaternary ammonium compound complex forms as an aqueous-immiscible phase in the brine within about 3 to 30 minutes. While the immiscible complex is also formed at lower brine solution temperatures, such lower temperatures are generally not preferred for substantially longer periods of time are required in order for the immiscible fatty acid complex to form.

The complex may be separated from the brine solution by any suitable means such as, for example, by flotation, skimming or agglomeration. Preferably, separation of the complex is effected by adding a conventional filter aid to the brine and then filtering the brine solution to separate the immiscible complex.

After separation of the complex from the brine solution, sodium tetraborate may be crystallized from the aqueous solution by any of the well-known and conventional procedures such as, for example, by controlled cooling in vacuum crystallizers. The sodium tetraborate concentration in the brine solution may vary widely from relatively dilute concentrations to relatively high concentrations. When substantially all of the fatty acids are removed from the brine before sodium tetraborate is crystallized therefrom, substantially all of the sodium tetraborate will have a desirable chunky crystal habit. However, when only a portion of the fatty acids are removed from the brine, a portion of the sodium tetraborate will have a desirable chunky crystal habit while the remainder of the borax will have an elongated needle-shaped crystal habit. Inasmuch as the fatty acids are removed from the solution prior to crystallization of the sodium tetraborate, the present invention also serves to reduce the amount of organic impurities associated with the sodium tetraborate crystals.

The following examples are set forth to illustrate, not to limit, the invention, whereby those skilled in the art may understand more fully the manner in which the present invention can be carried into effect. In the instant specification, appended claims and the following specific examples, all parts and percentages are by weight unless otherwise indicated.

Example I.—A quantity of hot, concentrated aqueous brine solution containing about 20% sodium tetraborate and about 50 p.p.m. of fatty acids and having a temperature of about 185° F. is introduced into a container. Dilauryldimethyl ammonium chloride is then added to the brine solution to provide a concentration of about 50 p.p.m. of the dilauryldimethyl ammonium chloride in the aqueous brine solution. The contents of the container are maintained at about 185° F., with agitation, for 30 minutes.

An aqueous immiscible phase which forms on the surface of the brine solution is separated from the solution by filtering the solution.

The filtered solution is then cooled to about 120°–125° F., causing sodium tetraborate decahydrate to crystallize out of solution. The sodium tetraborate crystals are recovered, washed, dried and examined microscopically. Substantially all of the sodium tetraborate crystals thus recovered have a chunky crystal habit.

Substantially similar results are obtained when the dilauryldimethyl ammonium chloride of this example is replaced by dipalmityldimethyl ammonium chloride, distearyldimethyl ammonium chloride, di(oleyl-linoleyl)dimethyl ammonium chloride, di(hydrogenated tallow)dimethyl ammonium chloride and tricaprylylmethyl ammonium chloride, respectively.

Example II.—The following series of tests indicates the effect of the method of the present invention on the crystal habit of sodium tetraborate crystallized from an aqueous brine solution.

A quantity of an aqueous brine solution is introduced into an agitated holding tank and heated to about 196° F. The solution contains about 20% by weight sodium tetraborate, 2% by weight KCl, 1% by weight NaCl, 1.5% by weight Na$_2$CO$_3$, 0.5% by weight Na$_2$SO$_4$ and about 75% by weight water, together with trace amounts of various materials, including about 25 p.p.m. of fatty acids.

In carrying out these tests, a standard amount of the aqeous solution is used in each test. This standard amount of solution is removed from the holding tank and introduced into a crystallizer in which the temperature is maintained at about 120°–125° F. to cause sodium tetraborate to crystallize out of the solution. The sodium tetraborate crystals are recovered from the solution, washed, dried and examined microscopically to determine their crystal habit.

In Run 1, the sample of aqueous brine solution is not contacted with a quaternary ammonium compound. In Runs 2, 3 and 4, ten, twenty and thirty p.p.m. respectively of dicocodimethyl ammonium chloride are added to separate samples of the hot aqueous brine solution before the solution is introduced into the crystallizer. In Runs 2, 3 and 4, the quaternary ammonium compound is admixed with the sample of hot brine solution for about 15 minutes, and the immiscible phase which forms is removed from the solution by filtration. The solution is then introduced into the crystallizer and processed in the same manner as the solution in Run 1.

The following results are observed:

Run 1—all the crystals have an elongated needle-shaped crystal habit.
Run 2—some chunky crystals are present; many of the crystals have an elongated needle-shaped crystal habit.
Run 3—substantially all of the crystals have a chunky crystal habit.
Run 4—all of the crystals have a chunky crystal habit.

Example III.—A 900 ml. sample of an aqueous brine solution containing about 20% sodium tetraborate, 2% KCl, 1.5% Na$_2$CO$_3$, 1% NaCl, 0.5% Na$_2$SO$_4$ and 75% water together with trace amounts of various ions, is introduced into a crystallizer and heated to about 195° F. About 10 mg. each of lauric acid, myristic acid, palmitic acid and stearic acid are added to the brine solution with continued heating and stirring. An aliquot of the resultant solution is transferred to a millipore pressure filtration apparatus and the hot solution forced through filter paper and sample (a) recovered.

About 60 microliters of dicocodimethyl ammonium chloride is then added to the remaining volume in the crystallizer (approximately 850 ml.) and the solution agitated for about 15 minutes. A second aliquot is then transferred to the millipore filtration apparatus, filtered and sample (b) recovered.

Subsequent additions of about 60 microliters, 110 microliters and 240 microliters of the dicocodimethyl ammonium chloride are made to the aqueous brine solution, with the solution being agitated for about 15 minutes after each addition and filtered before the subsequent addition to provide samples (c) (d) and (e) respectively.

The samples (a)–(e) thus obtained are analyzed for fatty acid content. The results of the analyses (in p.p.m.) are converted to micromolality. The quaternary ammonium chloride addition levels are similarly converted to micromolality. The respective fatty acid analysis data are then plotted in total micromolality versus micromolality of each quaternary ammonium chloride addition. The slope is then determined and shows the stoichiometry involved in the formation of the immiscible complex, namely, a substantially 1:1 stoichiometric insoluble complex is formed between the fatty acids present in the solution and the quaternary ammonium compound.

As will be understood by those skilled in the art, what has been described are preferred embodiments of the invention, however, many modifications, changes and substitutions can be made without departing from the scope and spirit of the appended claims.

What is claimed is:

1. A method of treating an aqueous brine solution containing sodium tetraborate and surface active fatty acids which comprises contacting said aqueous brine solution with a quaternary ammonium compound to form in said brine solution an immiscible complex of said quaternary ammonium compound and said fatty acids, separating said immiscible complex from said brine solution to thereby remove said fatty acids from the brine solution and thereafter crystallizing sodium tetraborate from said solution, said quaternary ammonium compound having the formula:

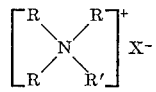

wherein R is selected from the group consisting of alkyl, alkene, alkyne radicals and long chain aliphatic hydrocarbon radicals having from 6 to 22 carbon atoms, R' is a long chain aliphatic hydrocarbon radical having from 6 to 22 carbon atoms, with R and R' together having at least about 20 and no more than about 65 carbon atoms, and X is an anion.

2. The method as defined in claim 1 in which said long chain aliphatic hydrocarbon radical contains no more than two double bonds.

3. The method as defined in claim 1 in which said quaternary ammonium compound contains at least two long chain aliphatic hydrocarbon radicals having from 6 to 22 carbon atoms.

4. The method as defined in claim 1 in which the amount of said quaternary ammonuium compound contacted with said aqueous brine solution is substantially stoichiometrically equivalent to the concentration of fatty acids in said aqueous brine solution.

5. The method as defined in claim 1 in which said aqueous brine solution is at an elevated temperature when it is contacted with said quaternary ammonium compound.

6. The method as defined in claim 1 in which said quaternary ammonium compound contains at least two long chain aliphatic hydrocarbon radicals having from 6 to 22 carbon atoms and is admixed with said aqueous brine solution having a temperature of between about 150° and 220° F. to form said immiscible complex, the amount of said quaternary ammonium compound admixed with said aqueous brine solution being substantially stoichiometrically equivalent to the concentration of fatty acids contained in said aqueous brine solution.

7. The method as defined in claim 1 in which said immiscible complex is a 1:1 stoichiometric complex of said quaternary ammonium compound and said fatty acids.

8. The method as defined in claim 1 in which said quaternary ammonium compound is selected from the group consisting of dilauryldimethylammonium chloride
dimyristyldimethylammonium chloride
dipalmityldimethylammonium chloride
distearyldimethylammonium chloride
di(oleyl-linoleyl)dimethylammonium chloride
dicocodimethylammonium chloride
di(hydrogenated tallow)dimethylammonium chloride
tricaprylylmethylammonium chloride
dilaurylmethylethylammonium chloride
stearyltrimethylammonium chloride
oleyltrimethylammonium chloride.

9. The method as defined in claim 1 in which the amount of said quaternary ammonium compound contacted with said aqueous brine solution is substantially stoichiometrically equivalent to the concentration of said fatty acids in said aqueous brine solution whereby substantially all of the sodium tetraborate crystallized from said solution has a chunky crystal habit.

10. The method as defined in claim 1 in which said sodium tetraborate is crystallized from said aqueous solution by cooling said solution.

References Cited
UNITED STATES PATENTS

| | | | |
|---|---|---|---|
| 3,002,810 | 10/1961 | Campbell, Jr. | 23—59 |
| 3,259,568 | 7/1966 | Jordan et al. | 210—59X |
| 3,389,081 | 6/1968 | Eckenfelder, Jr. et al. | 210—59X |

FOREIGN PATENTS

| | | | |
|---|---|---|---|
| 423,785 | 2/1935 | Great Britain | 23—59 |

MILTON WEISSMAN, Primary Examiner

U.S. Cl. X.R.

210—54

UNITED STATES PATENT OFFICE
CERTIFICATE OF CORRECTION

Patent No. 3,565,578                 Dated February 23, 1971

Inventor(s)    Kendrick R. Eilar et al.

It is certified that error appears in the above-identified patent and that said Letters Patent are hereby corrected as shown below:

In the heading to the printed specification, lines 5 to "American Potash & Chemical Corporation, Los Angeles, Calif., a corporation of Delaware" should read -- Kerr-McGee Chemical Corp., a corporation of Maryland --.

Signed and sealed this 14th day of September 1971.

(SEAL)
Attest:

EDWARD M. FLETCHER, JR.
Attesting Officer

ROBERT GOTTSCHALK
Acting Commissioner of Pate